(12) United States Patent
David et al.

(10) Patent No.: US 12,437,524 B2
(45) Date of Patent: *Oct. 7, 2025

(54) CLUSTER-CONNECTED NEURAL NETWORK

(71) Applicant: Nano Dimension Technologies, Ltd., Ness Ziona (IL)

(72) Inventors: Eli David, Tel Aviv (IL); Eri Rubin, Kibbutz Ma'ale Ha'hamisha (IL)

(73) Assignee: NANO DIMENSION TECHNOLOGIES, LTD., Ness Ziona (IL)

( * ) Notice: Subject to any disclaimer, the term of this patent is extended or adjusted under 35 U.S.C. 154(b) by 921 days.

This patent is subject to a terminal disclaimer.

(21) Appl. No.: 17/513,189

(22) Filed: Oct. 28, 2021

(65) Prior Publication Data

US 2022/0147828 A1 May 12, 2022

Related U.S. Application Data

(63) Continuation of application No. 17/095,154, filed on Nov. 11, 2020, now Pat. No. 11,164,084.

(51) Int. Cl.
*G06V 10/82* (2022.01)
*G06F 18/21* (2023.01)
(Continued)

(52) U.S. Cl.
CPC .............. *G06V 10/82* (2022.01); *G06N 3/04* (2013.01); *G06N 3/082* (2013.01); *G06V 10/764* (2022.01);
(Continued)

(58) Field of Classification Search
CPC .......... G06Q 20/3829; G06Q 20/3227; G06Q 20/3278; G06Q 20/38215; G06Q 20/401;
(Continued)

(56) References Cited

U.S. PATENT DOCUMENTS 6,421,467 B1 7/2002 Mitra
10,127,496 B1 11/2018 Fu et al.
(Continued)

FOREIGN PATENT DOCUMENTS

JP A 2006-163808 6/2006
JP A 2011-54200 3/2011
(Continued)

OTHER PUBLICATIONS

Ngo et al.,( NPL "Visual Analysis of Governing Topological Structures in Excitable Network Dynamics" Published 2016 (10 pages) (Year: 2016).*

(Continued)

*Primary Examiner* — Quoc A Tran
(74) *Attorney, Agent, or Firm* — PEARL COHEN ZEDEK LATZER BARATZ LLP (57) ABSTRACT

A device, system, and method is provided for training or prediction using a cluster-connected neural network. The cluster-connected neural network may be divided into a plurality of clusters of artificial neurons connected by weights or convolutional channels connected by convolutional filters. Within each cluster is a locally dense sub-network of intra-cluster weights or filters with a majority of pairs of neurons or channels connected by intra-cluster weights or filters that are co-activated together as an activation block during training or prediction. Outside each cluster is a globally sparse network of inter-cluster weights or filters with a minority of pairs of neurons or channels separated by a cluster border across different clusters connected by inter-cluster weights or filters. Training or predicting is performed using the cluster-connected neural network.

30 Claims, 5 Drawing Sheets

(51) Int. Cl.
  *G06N 3/04* (2023.01)
  *G06N 3/063* (2023.01)
  *G06N 3/082* (2023.01)
  *G06V 10/764* (2022.01)
  *G06V 10/776* (2022.01)

(52) U.S. Cl.
  CPC .......... *G06V 10/776* (2022.01); *G06F 18/217* (2023.01); *G06N 3/063* (2013.01)

(58) Field of Classification Search
  CPC ............... G06Q 20/409; G06Q 20/326; G06Q 20/3226; G06Q 20/367; G06Q 20/3825; H04L 9/0825
  See application file for complete search history.

(56) References Cited

U.S. PATENT DOCUMENTS

| | | | |
|---|---|---|---|
| 10,832,139 B2* | 11/2020 | Yan | G06N 3/048 |
| 11,353,868 B2 | 6/2022 | Appu et al. | |
| 11,461,614 B2* | 10/2022 | Baum | G06F 30/30 |
| 2007/0262737 A1 | 11/2007 | Hoffmann et al. | |
| 2016/0048756 A1 | 2/2016 | Hall et al. | |
| 2018/0198680 A1 | 7/2018 | Mladin et al. | |
| 2019/0080243 A1 | 3/2019 | David | |
| 2019/0108436 A1 | 4/2019 | David | |
| 2019/0188567 A1 | 6/2019 | Yao et al. | |
| 2019/0205759 A1 | 7/2019 | Zhang | |
| 2019/0272389 A1 | 9/2019 | Viente et al. | |
| 2019/0325317 A1 | 10/2019 | David | |
| 2019/0347536 A1 | 11/2019 | David et al. | |
| 2020/0105256 A1 | 4/2020 | Fainberg et al. | |
| 2020/0279167 A1 | 9/2020 | David et al. | |
| 2020/0320400 A1 | 10/2020 | David | |
| 2020/0410346 A1 | 12/2020 | Rappoport | |

FOREIGN PATENT DOCUMENTS

| | | |
|---|---|---|
| JP | A 2019-159997 | 9/2019 |
| KR | 1020180007657 | 1/2018 |
| KR | 1020180022288 | 3/2018 |
| TW | 201839643 | 11/2018 |

OTHER PUBLICATIONS

Japanese Office Action for Appl. No. 2021-181497 dated Jun. 14, 2022.

Office Action for Taiwan Patent Application No. 11220166090 dated Feb. 20, 2023.

Ngo, Q.Q. et al. (Jun. 2016). "Visual analysis of governing topological structures in excitable network dynamics". In Computer Graphics Forum (vol. 35, No. 3, pp. 301-310). DOI: 10.1111/cgf. 12906 (Year: 2016).

Zhang, Z.-z. et al. (Jul. 2014). "A brain-like multi-hierarchical modular neural network with applications to gas concentration forecasting". In 2014 International Joint Conference on Neural Networks (IJCN N) (pp. 398-403). IEEE. DOI: 10.1109/IJCN N. 2014.6889501 (Year: 2014).

Duggal, R. et al. (2019). "CUP: Cluster pruning for compressing deep neural networks". arXiv preprint arXiv:1911.08630. (Year:2019).

Fritzke, B. (1995). "A growing neural gas network learns topologies". Advances in neural information processing systems, 7, 625-632. (Year: 1995).

Hilgetag, C.C. et al. (2016). "Is the brain really a small-world network?". Brain Structure and Function, 221 (4), 2361-2366. DOI10.1007/s00429-015-1035-6 (Year: 2016).

Krishnan, G., et al. (2019). "Structural Pruning in Deep Neural Networks: A Small-World Approach". arXiv preprint arXiv:1911. 04453. (Year: 2019).

Ankit, A. et al. (Online: Oct. 11, 2019 ). "TraNNsformer: Clustered Pruning on Crossbar-Based Architectures for Energy-Efficient Neural Networks" Transactions on Computer-Aided Design of Integrated Circuits and Systems, 39(10), 2361-2374. DOI: 10.1109/ TCAD.2019.2946820 (Year: 2019).

Hutt, M.T. et al. (2014). "Perspective: network-guided pattern formation of neural dynamics". Philosophical Transactions of the Royal Society B: Biological Sciences, 369(1653), 20130522. DOI: 10.1098/rstb.2013.0522 (Year: 2014).

Mohammad Javad Shafiee et al: "Evolution in Groups: A deeper look at synaptic cluster driven evolution of deep neural networks", arxiv.org, Cornell University Library, 201 Olin Library Cornell University Ithaca, NY 14853,Apr. 7, 2017 (Apr. 7, 2017), XP080761360.

Ankit Aayush et al: "TraNNsformer: Clustered Pruning on Crossbar-Based Architectures for Energy-Efficient Neural Networks", IEEE Transactions on Computer-Aided Design of Integrated Circuits and Systems, IEEE, USA, vol. 39, No. 10, Oct. 11, 2019 (Oct. 11, 2019), pp. 2361-2374, XP011810883, ISSN: 0278-0070, DOI: 10.1109/ TCAD.2019.2946820 [retrieved on Sep. 22, 2020].

Gokul Krishnan et al: "Structural Pruning in Deep Neural Networks: A Small-World Approach", arxiv.org, Cornell University Library, 201 Olin Library Cornell University Ithaca, NY 14853, Nov. 11, 2019 (Nov. 11, 2019), XP081530223.

European Search Report for pat. appl. No. 21205305.2 dated May 9, 2022.

Offiec Action for Korean Appl. No. 10-2021-0154639 dated Mar. 30, 2022.

Shafiee, et al., 'Evolution in Groups: A deeper look at synaptic cluster driven evolution of deep neural networks', arXiv:1704. 02081v1 (Apr. 7, 2017.).

Office Action for Korean Patent Appl. No. 10-2021-0154639 dated Nov. 28, 2022.

* cited by examiner

| From Neuron ID | To Neuron ID | Weight |
|---|---|---|
| 2 | 7 | 1.2 |
| 7 | 10 | 0.4 |

Inter-cluster triplet representation

Fig. 4

Cluster-connected neural network

CLUSTER-CONNECTED NEURAL NETWORK

CROSS-REFERENCE TO RELATED APPLICATIONS

This application is a continuation of U.S. patent application Ser. No. 17/095,154 filed Nov. 11, 2020 which will issue as U.S. Pat. No. 11,164,084 on Nov. 2, 2021, entitled "Cluster-Connected Neural Network", which is hereby incorporated by reference in its entirety.

FIELD OF THE INVENTION

Embodiments of the invention are related to the field of artificial intelligence (AI) by machine learning. In particular, embodiments of the invention are related to deep learning using neural networks.

BACKGROUND OF THE INVENTION

An artificial neural network, or simply "neural network," is a computer model, resembling a biological network of neurons, which is trained by machine learning. A traditional neural network has an input layer, multiple middle or hidden layer(s), and an output layer. Each layer has a plurality (e.g., 100s to 1000s) of artificial "neurons." Each neuron in a layer (N) may be connected by an artificial "synapse" to some or all neurons in a prior (N−1) layer and subsequent (N+1) layer to form a "partially-connected" or "fully-connected" neural network. The strength of each synapse connection is represented by a weight. Thus, a neural network may be represented by a set of all weights in the network.

A neural network (NN) is trained based on a learning dataset to solve or learn a weight of each synapse indicating the strength of that connection. The weights of the synapses are generally initialized, e.g., randomly. Training is performed by iteratively inputting a sample dataset into the neural network, outputting a result of the neural network applied to the dataset, calculating errors between the expected (e.g., target) and actual outputs, and adjusting neural network weights using an error correction algorithm (e.g., backpropagation) to minimize errors. Training may be repeated until the error is minimized or converges. Typically multiple passes (e.g., tens or hundreds) through the training set is performed (e.g., each sample is input into the neural network multiple times). Each complete pass over the entire training set is referred to as one "epoch".

State-of-the-art neural networks typically have between millions and billions of weights, and as a result require specialized hardware (usually a GPU) for both training and runtime (prediction) phases. It is thereby impractical to run deep learning models, even in prediction mode, on most endpoint devices (e.g., IoT devices, mobile devices, or even laptops and desktops without dedicated accelerator hardware). Effectively running deep learning models on devices with limited processing speed and/or limited memory availability remains a critical challenge today.

To address the problem of limited hardware capacity, nowadays most deep learning prediction is conducted on a remote server or cloud. For example, a smart assistant (e.g., Alexa) sends information (e.g., voice signal) to the cloud, the deep learning prediction is performed remotely at the cloud on dedicated hardware, and a response is sent back to the local device. Hence, these endpoint devices cannot provide deep learning based results if they are disconnected from the cloud, if the input rate is so high that it is not feasible to continuously communicate with the cloud, or if very fast prediction is required where even the dedicated hardware is not fast enough today (e.g., deep learning for high frequency trading).

Accordingly, there is a need in the art to increase the efficiency and decrease the memory requirements of deep learning for neural network in training and/or prediction modes.

SUMMARY OF THE INVENTION

According to some embodiments of the invention, there is provided a device, system and method for training and prediction using a "cluster-connected" neural network that is locally fully or densely-connected within clusters (e.g., encouraging intra-cluster weights inside a local cluster) and globally sparsely-connected outside of the clusters (e.g., eliminating inter-cluster weights across cluster borders). Clusters may be shaped as columns, encouraging the typically predominant direction of neuron activation extending from the input toward the output layer (e.g., parallel to the neural network axis), and discouraging the typically less predominant lateral neuron activation (e.g., orthogonal to the neural network axis). As an example, in a neural network comprising two layers of 1000 neurons each, the layers are connected by one million weights (1,000×1,000) in a fully-connected design, but only a hundred thousand when divided into ten columns (100×100×10) plus a few sparse remaining inter-column weights in a column-connected design. This column-connected neural network thereby provides an approximately ten-fold increase in computational speed during run-time prediction and an approximately ten-fold reduction in memory for storing one-tenth of the number of inter-cluster weights with a new sparse indexing, as compared to a fully-connected neural network with substantially the same accuracy. This column-connected neural network also increases the speed of training compared to a fully-connected neural network with substantially the same accuracy. For example, when the neural network is initialized as a cluster-connected neural network, the increase in the training speed is maximized, on the same order as the runtime speed up (e.g., ten-fold in the above scenario). In another example, when the neural network is initialized as a fully-connected neural network, the speed of training increases in each sequential training iteration, as more and more synapses are removed or pruned, until the column-connected neural network is formed and the full training speed up is achieved (e.g., ten-fold in the above scenario).

According to some embodiments of the invention, there is provided a device, system and method for training or prediction using a cluster-connected neural network. A cluster-connected neural network may be divided into a plurality of clusters. Each cluster may comprise a different plurality of artificial neurons or convolutional channels, wherein each pair of neurons or channels are uniquely connected by a weight or convolutional filter. Within each cluster of the cluster-connected neural network, a locally dense sub-network of intra-cluster weights or filters may be generated or maintained, in which a majority of pairs of neurons or channels within the same cluster are connected by intra-cluster weights or filters, such that, the connected majority of pairs of neurons or channels in each cluster are co-activated together as an activation block during training or prediction using the cluster-connected neural network. Outside each cluster of the cluster-connected neural network, a globally sparse network of inter-cluster weights or filters may be generated or maintained, in which a minority of pairs of neurons or channels separated by a cluster border across different clusters are connected by inter-cluster weights or filters. The cluster-connected neural network may be executed for training and/or predicting.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

An individual neuron's activation depends on the activation patterns of its surrounding neighbor neurons. A neuron that is connected to a cluster of neurons with relatively higher weights is more likely to be activated than if it were connected to a cluster with relatively lower weights. Neurons thus activate in clusters. A cluster-based neural network according to embodiments of the invention strengthens weights inside each cluster (intra-cluster weights) where activation dominates, and reduces or eliminates weights outside of clusters (inter-cluster weights) often exhibiting only minor activation. By encouraging the dominant intra-cluster weights, and eliminating weak inter-cluster weights, embodiments of the invention form a cluster-connected neural network, in which neurons are densely connected within each cluster (locally dense) and sparsely connected across different clusters (globally sparse). Cluster-connected neural network improve efficiency compared to conventional neural network by focusing computational effort on the most impactful intra-cluster neuron activations, and eliminating or reducing computational effort for the less consequential inter-cluster neuron activations, to achieve substantially the same result with significantly less processing effort and time.

Figure 1:
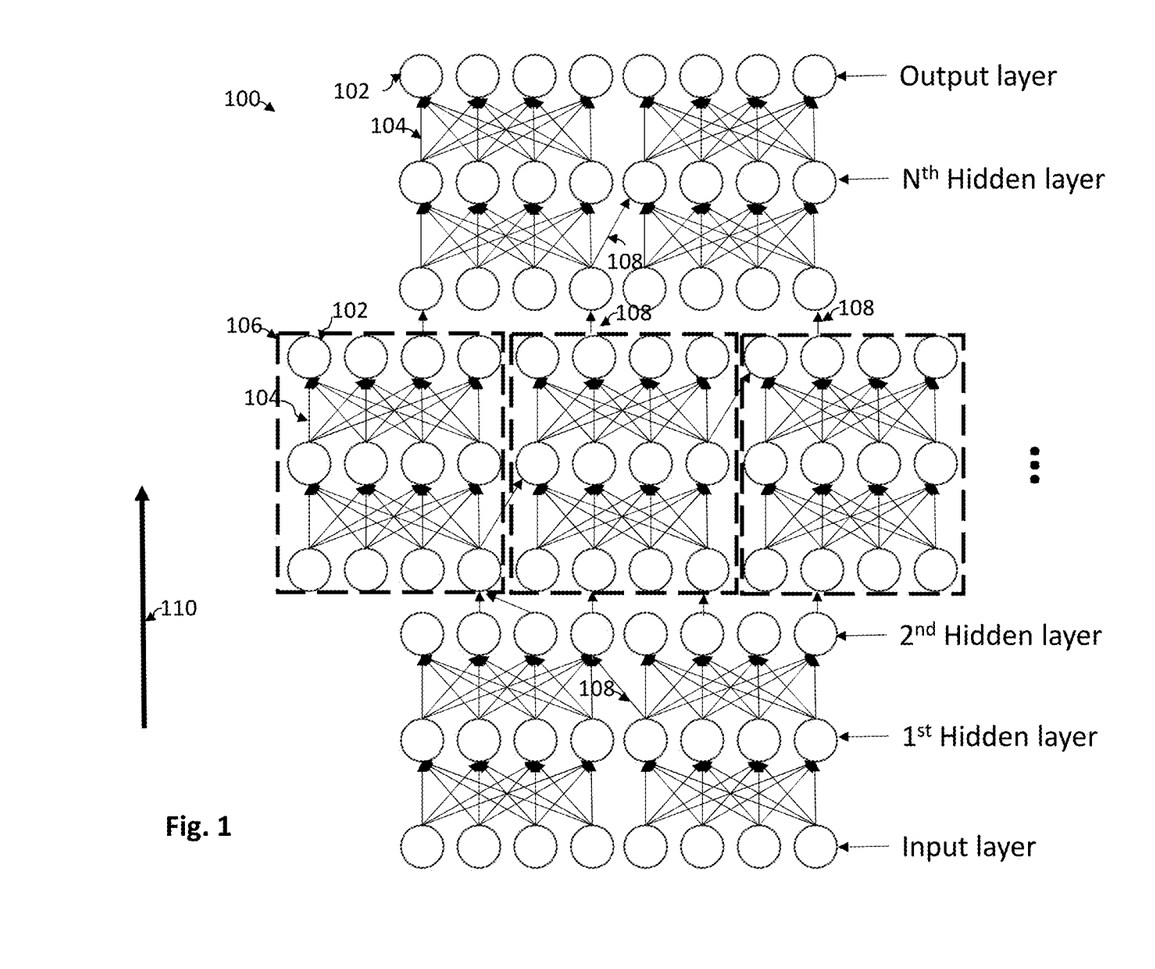
FIG. 1 is a schematic illustration of a cluster-connected neural network, in accordance with some embodiments of the invention.

Neurons typically activate predominantly in the same direction as the neural network axis (e.g., in the orientation neural network axis 110 of FIG. 1 extending from the input to output layer, orthogonal to the layer planes). In the example shown in FIG. 1, in which the neural network is oriented vertically, neuron activation predominates in vertical clusters, thus forming column-shaped clusters 106. While column-shaped clusters are used in FIG. 1, other cluster shapes may be used e.g., that are borders of highly-connected neuron activation regions. For example, the shapes of the borders of neuron clusters may include circles, columns, rows, polygons, irregular shapes, and/or any 2D or 3D shapes. Clusters may be aligned or misaligned (e.g., staggered columns), various sizes (e.g., 4×2 neuron columns, 3×6 neuron rows, etc.), various orientations, overlapping or non-overlapping, etc. While some clusters represent a group of neighboring neurons, additionally or alternatively, some clusters may represent non-adjacent or non-neighboring neurons (e.g., selected based on weight value, instead of, or in addition to, proximity). In one example, row-shaped clusters may be equivalent to column-shaped clusters if the neural network orientation 110 of FIG. 1 were rotated to a horizontal orientation. Additionally or alternatively, in the depicted orientation of FIG. 1, row clusters may be used for recurrent neural networks in which neurons are connect to other neurons in the same layer. In some embodiments, a combination of column and row clusters may be used. For example, using row clusters in areas where recurrent or intra-layer connections predominate and/or column clusters in areas where inter-layer connections predominate. Additionally or alternatively, 3D clusters may be used for a 3D neural network (e.g., such as a convolutional neural network (CNN) with multi-dimensional channels of filters).

In some embodiments, tests may be performed to determine an optimal pattern of cluster shapes. For example, cluster shapes may be defined that group neurons with the highest collective group weight (e.g., testing all, a subset of localized, or a random or semi-random sampling, of neurons), neurons with the most resilient (e.g., slowest changing) weights over multiple training iterations or epochs, or any other measure of neuron pair or group weights. Test analysis may be performed once, periodically, for each epoch, at any other regular or irregular time intervals, and/or triggered by any other event or criterion (e.g., weights crossing a threshold). Test statistics may be computed independently of, or as part of the training computations. In some embodiments, as neuron weights change during training, the pattern and shapes of clusters may be dynamically adjusted to maintain an optimal clustering.

To train cluster-connected neural networks, some embodiments of the invention may start with a fully-connected neural network and prune inter-cluster weights. Other embodiments of the invention may start with disconnected clusters and add select inter-cluster weights.

Weight training may be biased in favor of strengthening or adding intra-cluster weights (connecting neurons both located within the same cluster) and weakening or pruning inter-cluster weights (crossing a cluster border to connect neurons located across different clusters). Inter-cluster weights may be diminished or pruned using $L_1$ regularization, $L_p$ regularization, thresholding, random zero-ing, new weight generation, evolving weights using genetic algorithms, and/or bias based pruning. In some embodiments, weight strength may be biased inversely proportionally to the distance between neurons. For example, weights may be biased to be stronger the closer the connected neurons are to each other, and weaker the farther the connected neurons are located from each other. For example, $L_p$ regularization may push weights in the network to zero, e.g., as $w'_{ij} = w_{ij} - p * w_{ij}^{p-}$ 1*d, where d represents a distance between the ith and jth neurons connected by weight $w_{ij}$. Accordingly, the greater the neuron distance d, the faster $L_p$ regularization drives the weight $w_{ij}$ to zero. The neuron distance d may be any metric of neuron separation or proximity, for example, based on a number of neurons, layers, clusters, etc. separating the two connected ith and jth neurons.

A subset (e.g., minority) of all possible inter-cluster weights 108 may be added or maintained. In various embodiments, inter-cluster weights 108 may be added or maintained that have an above threshold weight, are among the top N (predetermined number) of highest inter-cluster weights, connect neurons with a smallest or below threshold distance, or other criteria. In some embodiments, only neurons located along a cluster border (but not interior non-border neurons) are allowed to connect to neurons in different clusters via inter-cluster weights. In some embodiments, each neuron (or only border neurons) is allowed a predetermined number of inter-cluster weights, or proportion of inter-cluster to intra-cluster weights.

In various embodiments, neurons may be fully and/or partially connected within each cluster. In some hybrid embodiments, various regions, layers, subsets of neurons/weights, etc. may be cluster-connected, non-cluster-connected, fully-connected, partially-connected, or otherwise connected. In one embodiment, a combination of fully and partially connected clusters may be used. For example, different types of clusters may use different connection patterns, such as fully-connected column clusters (e.g., representing more important inter-layer connections) and partially-connected row cluster (e.g., representing less important recurrent intra-layer connections). Another hybrid embodiment may use cluster-connected neurons for a subset of regions, while other regions may use standard connections.

Some embodiments may generate a sparse convolutional neural network (CNN). A CNN is represented by a plurality of filters that connect a channel of an input layer to a channel of a convolutional layer. The filter scans the input channel, operating on each progressive region of neurons (e.g., representing a N×N pixel image region), and maps the convolution or other transformation of each region to a single neuron in the convolution channel. By connecting entire regions of multiple neurons to each single convolution neuron, filters form synapses having a many-to-one neuron connection, which reduces the number of synapses in CNNs as compared to the one-to-one neuron connections in standard NNs. Some embodiments may generate a cluster-connected CNN by grouping clusters of channels and pruning or zeroing inter-cluster filters that connect channels from different clusters.

Figure 2:
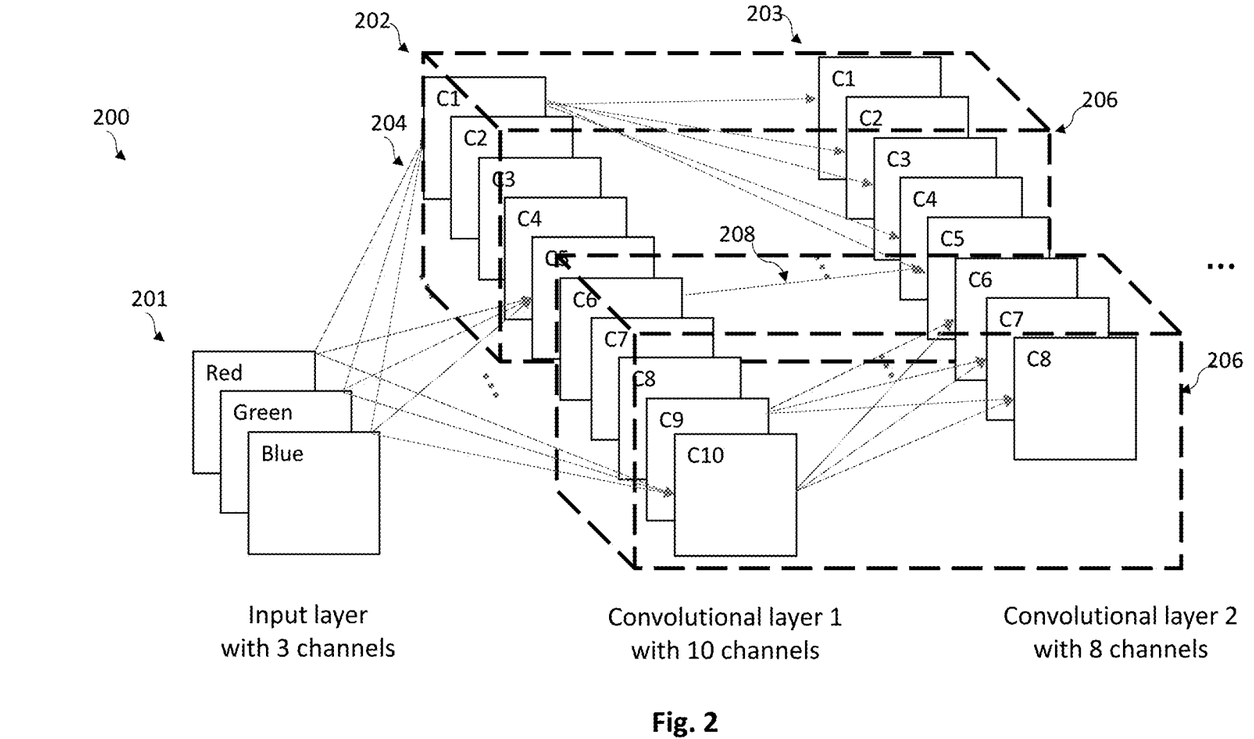
FIG. 2 is a schematic illustration of a cluster-connected convolutional neural network, in accordance with some embodiments of the invention.

In CNNs, filters may be two-dimensional (2D) (connecting each single channel in a first layer with a single channel in a second layer) or three-dimensional (3D) (connect each single channel in a second layer with a plurality of channels in a first layer). For example, the cluster-connected CNN 200 shown in FIG. 2 may connect the input and 1st convolution layers with thirty 2D filters, or ten 3D filters. Accordingly, CNN clusters 206 may also be 2D (grouping 2D filters) or 3D (grouping 3D filters or multiple layers of 2D filters) as shown in FIG. 2. Pruning may thus delete inter-cluster filters 208 that are 2D or 3D (in FIG. 2), or any combination thereof, in a CNN.

Embodiments of the invention provide a novel system and method to train and predict using a cluster-connected neural network that is densely connected within each cluster (e.g., locally fully-connected intra-cluster weights) and sparsely connected across clusters boundaries (e.g., globally sparse inter-cluster weights). Sparsification may be achieved by pruning inter-cluster weights during the training phase or by evolving the neural network (e.g., to reduce or eliminate inter-cluster weights by mutations using genetic algorithms). These embodiments provide several significant improvements:

- Enables a significant amount of sparsity in the neural networks. Inter-cluster weights account for the vast majority of network weights, most of which span far distances and are thus less likely to be as important as local intra-cluster weights. In the above example, dividing two layers of one thousand neurons each into ten column clusters reduces the number of weights 90%, from one million weights (1,000×1,000) in a fully-connected design, to a hundred thousand (100×100×10) in a column-connected design. The few remaining inter-cluster weights are sparse and account for only a small increase in the number of weights.
- Pruning during training allows the remaining weights to offset differences caused by pruning, resulting in substantially the same predictive accuracy before pruning (e.g., in the fully-connected network) and after pruning (e.g., in the cluster-connected network).
- Results in both prediction mode and training mode having a linear speed-up directly proportional to the amount of sparsity induced in the neural network. For example, a 50% sparse cluster-connected neural network (retaining less than 50% or a minority of its weights) results in two times (or 200%) faster prediction and training. In the above example, a 90% sparse cluster-connected neural network (retaining 10% of its weights) results in 10 times (or 1000%) faster prediction and training. In general, the greater the sparsity of the neural network, the faster the prediction and training times.
- Results in an approximately linear decrease in memory usage with cluster-based indexing. Locally dense clusters may represent their intra-cluster weights by a cluster index associated with each cluster-specific matrix for fast matrix multiplication. However, the vast majority of globally sparse inter-cluster weights may be indexed independently for each non-zero inter-cluster weight, eliminating the need to store zero inter-cluster weights. Eliminating the majority of zero inter-cluster weights, while using additional (e.g., twice the) memory for independently indexing each non-zero inter-cluster weight (e.g., storing the index as well as the value), results in a 10/2 or 5 times (80%) reduction in memory consumption for storing inter-cluster weights pruned by a 90% proportion.
- Results in a linear speed-up on any hardware. For example, a cluster-connected neural network that is 90% sparse results in a 10 times speed-up in comparison to a fully-connected neural network, regardless of the computation device, e.g., whether running on a slow CPU or a fast dedicated GPU. In other words, while embodiments of the invention may provide improvements to efficiency that allow deep learning of networks on CPU or memory restricted devices (that cannot efficiently process or store conventional neural networks), the same embodiments may be implemented by fast hardware to result in a speed-up and storage reduction of several orders of magnitude (this is critical in areas such as real-time navigation, where it is infeasible to use deep learning even on the fastest dedicated hardware).

The method is agnostic to the type of neural network and can be applied to any neural network architecture, for example, including but not limited to, fully connected, partially connected, convolutional, recurrent, etc., and results in significant sparsity without adversely affecting the network accuracy.

Matrix representation, while convenient and efficient to implement for dense neural networks (having many or a majority of active synapses), is not an efficient representation for sparse neural networks (having few or a minority of connected synapses). The speed of neural network prediction is proportional to the number of weights in the neural network. For an example matrix with 10×20 weights, the matrix would represent a sparse neural network by setting the values of most of the weights to zero. However, zeroing matrix weights does not reduce the number of entries in the matrix and therefore does not reduce the number of computations performed over the neural network. Thus, the memory and computational requirements in the matrix representation are the same for a sparse neural network as for a dense neural network (the zero value is stored and multiplied just like a non-zero value in matrix multiplication). In other words, setting weights to zero in the matrix representation does not eliminate those weights from memory or reduce the number of associated computations. Accordingly, pruning weights in the cluster-connected neural network does not reduce its memory using conventional matrix representations.

A new compact representation of cluster-connected neural networks is provided according to some embodiments of the invention that independently indexes each inter-cluster weight (independently defines which synapse the weight represents), which allows inter-cluster weights of pruned or omitted synapses to be skipped or discarded. In conventional matrix representation, each weight is indexed by its position in the matrix (e.g., a weight in row i column j represents the synapse connecting the ith neuron in a first layer to a jth neuron in a second layer). Additional matrices may be used to store weights for each pair of layers. Because indexing is based on matrix position, weights cannot be eliminated as they would shift the position of other weights in the matrix. This causes a sparse neural network to be represented by a sparse matrix of mostly zero entries, which is a waste of both memory for storing mostly zero weights and computations for multiplying the zero weights. By independently indexing each inter-cluster weight according to embodiments of the invention, the indices of weights do not depend on each other, and so each pruned inter-cluster weight may be discarded entirely without affecting the indexing of other inter or intra-cluster weights. This independent indexing thereby eliminates the need to store entries for disconnected inter-cluster synapses (reducing memory consumption) and eliminates computations performed based on disconnected inter-cluster synapses (increasing processing speed). Because the speed of running a neural network is proportional to the number of weights therein, a sparse cluster-connected neural network according to embodiments of the invention with only a fraction of cross-cluster neurons connected by inter-cluster weights will run and be trained in a fraction of the time as does a densely or fully connected neural network.

Because the cluster-connected neural network has an arrangement of locally dense number of intra-cluster weights within each cluster, but a globally sparse arrangement of inter-cluster weights outside each cluster, embodiments of the invention provide a hybrid indexing system that indexes inter-cluster and intra-cluster weights differently. To take advantage of its global sparsity, the inter-cluster weights may be indexed by the above new compact indexing that uniquely and independently indexes each inter-cluster weights, thereby avoiding logging zero inter-cluster weights. On the other hand, to take advantage of its local density, the intra-cluster weights within each cluster may be indexed by a cluster index in combination with a dense sub-matrix representing the weights within each cluster by their position, benefitting from cluster-by-cluster fast matrix multiplication.

Embodiments of the invention support many methods of indexing a sparse neural network, including but not limited to, independently indexing each synapse or weight (e.g., using the triplet representation of FIG. 4), a compressed sparse row (CSR) representation, a compressed sparse column (CSC) representation, a map representation, a list representation, a dual-array representation (one array storing non-zero elements and another array storing their indices), a sparse tensor representation, or any other sparse neural network or matrix indexing.

Reference is made to FIG. 1, which schematically illustrates a cluster-connected neural network 100 in accordance with some embodiments of the invention.

A cluster-connected neural network 100 includes a plurality of artificial neurons 102 connected by a plurality of synapse connections (depicted by arrows connecting neurons in FIG. 1). Cluster-connected neural network 100 may be represented by a plurality of weights representing the strengths of the respective plurality of synapse connections. Synapse connections may be connected by either intra-cluster weights 104 (connecting two neurons both inside of the same cluster) and inter-cluster weights 108 (crossing a cluster 106 border (dashed bounding boxes) to connect neurons located across different clusters).

Artificial neurons 102 may be arranged in a hierarchy of multiple layers. Neural network 100 may include an input layer, one or more middle or hidden layer(s) (1, 2, . . . N), and an output layer. The cluster-connected neural network 100 is divided into a plurality of neuron clusters 106. The neuron clusters 106 shown in FIG. 1 are column-shaped, although other cluster shapes may be used.

Each neuron 102 in each clusters 106 is connected by intra-cluster weights 104 to (all) neurons (fully-connected) in adjacent layers inside that cluster 106. However, each neuron 102 in each clusters 106 is disconnected from most (or all) neurons in different clusters 106. In some embodiments, a subset or minority of neurons in each clusters 106 (e.g., only border neurons positioned along the dotted line of the cluster 106 boundary) are connected by inter-cluster weights 108 to neurons in different clusters 106. Accordingly, inside each cluster 106 is a locally dense sub-network of fully interconnected neurons, while outside of the clusters 106 is a globally sparse neural network of mostly sparse disconnected neurons.

Accordingly, cluster-connected neural network 100 may be locally "dense," in which a majority or greater than or equal to a threshold percentage of neurons 102 within each cluster 106 are connected by intra-cluster weights 104 (e.g., having non-zero connection weights). The threshold may be any percentage in a range of from greater than 50% (majority connected) to 100% ("fully-connected"), and is typically 90-99% connected. In the example shown in FIG. 1, all neurons 102 within each cluster 106 are connected to all other neurons in adjacent layers, so each cluster 106 is fully-connected. In this example, each pair of adjacent layers of four neurons has 16 possible connections, and with two pairs of adjacent layers, there are 32 neuron connections and associated intra-cluster weights 104 in each cluster 106.

Cluster-connected neural network 100 may be globally "sparse," in which a minority or less than or equal to a threshold percentage of neurons across the entire neural network 100 and/or among cross-clusters neurons are connected by inter-clusters weights 108 (or a majority or greater than a threshold percentage of cross-cluster neurons are not connected). The threshold may be any percentage in a range of less than 50% (minority connected) and may be 1-10% connected. In some embodiments, the number or density of inter-clusters weights 108 may be accuracy driven, for example, to be a minimum number that achieves an above threshold accuracy. In the example shown in FIG. 1, there are only a few sparse inter-clusters weights 108.

In some embodiments, cluster-connected neural network 100 may initiate training as a dense neural network and may be transformed to generate the sparse cluster-connected neural network 100 of FIG. 1 by pruning a majority or an above threshold percentage of inter-cluster weights 108. Weights may be pruned by disconnecting previously connected neuron pairs. Cluster-connected neural network 100 may be trained using methods such as genetic algorithms, genetic programming, reinforcement learning, etc., that evolve the neural network. Cluster-connected neural network 100 may have a hybrid mixture of various types of connections, such as, e.g., locally connections, recurrent connections, skip connections, etc. with a globally sparse representation. Evolving a neural network with such a mixture of connection may be efficiently performed using the compact independent indexing according to embodiments of the invention to index inter-clusters weights 108 and/or intra-clusters weights 104. Additionally or alternatively, cluster-connected neural network 100 may be generated or received as a sparse network in the first place (without pruning). In some embodiments, cluster-connected neural network 100 may be initiated with only intra-cluster weights 104 (but not inter-cluster weights 108), and the sparse subset of inter-cluster weights 108 may be added during training.

Figures 3, 4:
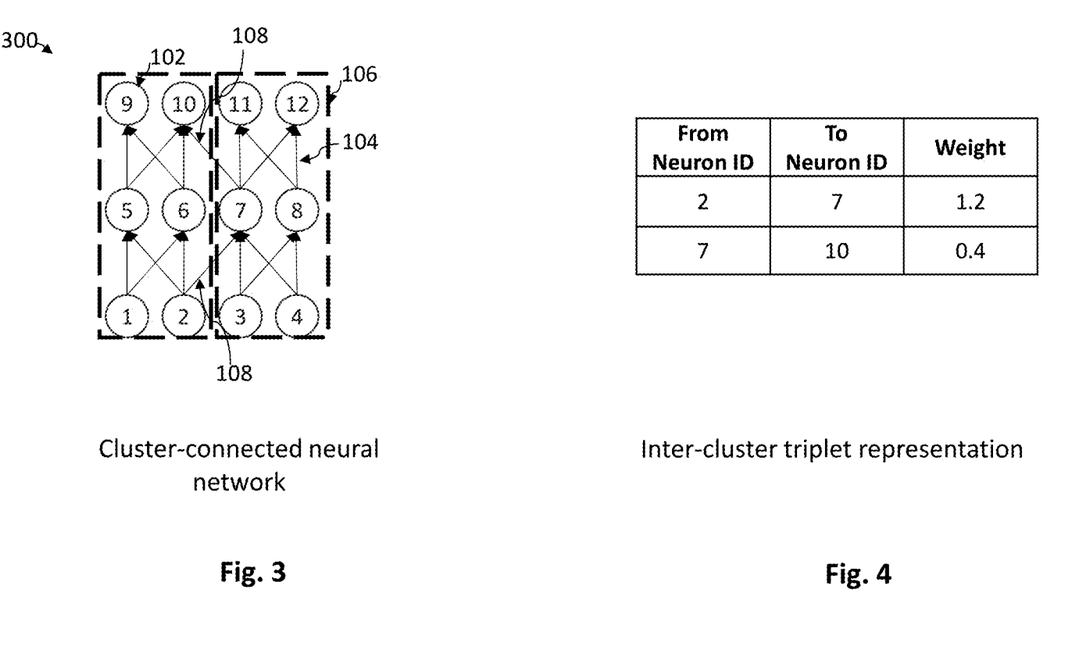
FIG. 3 is a schematic illustration of a cluster-connected neural network and FIG. 4 is a data structure for storing inter-cluster weights in the network of FIG. 3, in accordance with some embodiments of the invention.

In conventional matrices, pruned or omitted weights are set to zero, and treated the same as connected weights, which yields no significant storage or processing benefit to pruning. According to embodiments of the invention, a new data structure is provided as shown in FIG. 4 that represents the plurality of inter-cluster weights 108 of cluster-connected neural network 300 of FIG. 3 by the value of the inter-cluster weights 108 (column 3) and an associated with a unique index (columns 1-2). Because inter-cluster weights 108 are explicitly indexed in each data entry, the order of the data entries in representation in FIG. 4 no longer serves as their implicit index, and the weight entries may be shuffled or reordered with no loss of information. In particular, there is no reason to store a value of zero for an inter-cluster weight 108 as a placeholder to maintain indexing as in matrix representations. Accordingly, when two inter-cluster neurons are disconnected (by pruning) or not connected in the first place, the data structure of FIG. 4 simply deletes or omits an entry for that connection entirely (e.g., no record of a weight or any information is stored for that connection).

By only storing non-zero inter-cluster weights 108 that represent active cross-cluster connections between pairs of neurons 102 (and not storing zero inter-cluster weights that represent disconnections, inactive connections, or no connections, between pairs of neurons), the data structure of FIG. 4 may reduce the memory for storing sparse inter-cluster weights 108 of cluster-connected neural network 300 by an amount directly proportional to the sparsity of the inter-cluster weights 108 and/or network 300 at large. If X % of the inter-cluster weights 108 are removed or omitted leaving only 100–X % of the total weights, and the index uses the same number of bits as the weight, then the weight entries may occupy 2×(100–X) % of the storage than occupied by a fully connected neural network (e.g., a 99% sparsity results in a sparse representation that requires only 2% of the memory used for the dense representation, i.e., 50 times less memory usage).

In some embodiments, the dense intra-cluster weights 104 may be stored by matrices that are more efficient for storing dense or fully-connected weights. In addition to or instead of one global matrix for the entire cluster-connected neural network 300, each cluster 106 may be treated as a sub-network, represented by a unique cluster index and its intra-cluster weights 104 may be represented by a corresponding cluster-specific sub-matrix.

The speed of running a neural network is proportional to the number of weights in the neural network. Pruning or omitting connections in cluster-connected neural network 100 may result in a direct prediction speed-up in proportion to the amount of sparsity (e.g., if X % of the inter-cluster synapses are removed or omitted leaving only 100–X % of the total synapses, then the resulting cluster-connected neural network will perform 100/(100–X) times faster than a fully connected neural network).

Reference is made to FIG. 2, which schematically illustrates a cluster-connected convolutional neural network 200, in accordance with some embodiments of the invention.

Convolutional neural network 200 includes an input layer 201, one or more convolutional layers 202 and 203, and one or more output layers. Each layer 201, 202, 203, . . . of CNN 200 may have one or a plurality of channels. In the example shown in FIG. 2, the input layer 201 represents a color image and has three color-channels (e.g., red, green and blue channels). The first convolution layer 202 has a plurality of (e.g., ten) channels (e.g., C1-C10) and the second convolution layer 203 has a plurality of (e.g., eight) channels (e.g., C1-C8). Each convolution channel may represent a feature map of a feature, such as edges, lines, circles, or more complex objects in higher layers, such as apples, hammers, etc. These channels of features typically emerge entirely from the training process of the neural network (and are not manually specified).

In a fully-connected CNN, each channel in a layer may be connected to each channel in a subsequent layer by a convolution filter 204. Each filter 204 represents a group of a plurality of weights that are the convolution or transformation of regions of neurons (e.g., representing an N×N pixel image region) of one channel to neurons in a channel of an (adjacent or non-adjacent) convolution layer. An example 2D convolution filter 204 includes a set of N×N weights (e.g., a, b, c, . . . ) such that it convolves each N×N group of neurons (e.g., 1, 2, 3, . . . NN) in an input channel (e.g., 1a+2b+3c+ . . . ) to equal a single connected convolution neuron in a convolution channel. The same single convolution filter 204 of N×N weights is used to convolve all N×N groups of neurons throughout the input channel. In general, convolution filter 204 may have various dimensions including one-dimensional (1D) (e.g., a 1×N row filter or N×1 column filter operating on a column or row of neurons), two-dimensional (2D) (e.g., a N×M filter operating on a 2D grid of neurons), three-dimensional (3D) (e.g., a N×M×P filter operating on a grid over multiple channels in a layer), . . . , or N-dimensional (ND) (e.g., operating on a grid over multiple channels and multiple layers). For example, each color-channel of input layer 201 may be connected to each convolutional channel C1-C10 in first convolution layer 202, which may in turn be connected to each convolutional channel C1-C8 in second convolution layer 203. In the example of FIG. 2, there are three channels in the input layer 201, ten channels C1-C10 in the first convolution layer 202, and eight channels C1-C8 in the second convolution layer 203, resulting in a total of N=240 possible filters 204 in a fully-connected architecture connecting every pair of channels from the input and convolution layers 201, 202, 203, . . . . CNN 200 typically has many more convolution layers and/or other (e.g., max-pooling) layers than shown, which causes the number of filters to grow exponentially (e.g., to thousands, millions, or billions of filters 204).

Embodiments of the invention may create a sparse cluster-connected CNN 200 by grouping channels into a plurality of discrete clusters 206 and pruning or omitting many or most inter-cluster filters 208 that cross borders to connect channels located in different clusters. When channels are divided by a significant number of clusters 206 (e.g., greater than 3, and preferably tens, or even hundreds of clusters), a vast majority of fully-connected CNN filters are inter-cluster filters 208. Accordingly, by pruning all but a sparse arrangement of inter-cluster filters 208, embodiments of the invention generate a globally sparse cluster-connected CNN 200. Operating a cluster-connected CNN 200 with pruned or omitted inter-cluster filters 208 avoids executing their associated convolution operations and speeds-up training and/or prediction of cluster-connected CNN 200.

Whereas conventional CNNs store and operate on zero filters in the same way as non-zero filters, which yields no significant storage or processing benefit to pruning, according to embodiments of the invention, a new data structure is provided which only stores non-zero inter-cluster filters 208. The new data structure may use a compact sparse indexing method, such as, the triplet representation of FIG. 4 such that the two channel indices (columns 1-2) uniquely define the input/output channels connected by the inter-cluster filters 208 and one filter representation (column 3) that defines the filter's weight value. Because inter-cluster filters 208 are explicitly indexed in each data entry, the matrix position of the data entries no longer serves as their implicit index, and inter-cluster filter entries may be shuffled, reordered or deleted with no loss of information. In particular, there is no reason to store a zero inter-cluster filters (a filter with all zero weights) as a placeholder to maintain indexing as in matrix representations. Accordingly, when channels of neurons are disconnected (by pruning) or not connected in the first place, the data structure of FIG. 4 simply deletes or omits an entry for the associated filter entirely (e.g., no record of any weight or any information is stored for that filter). In various embodiments, the data structure may omit 1D, 2D, 3D, or ND filters, e.g., as predefined or as the highest dimensionality that is fully zeroed. In CNNs, filters may be two-dimensional (2D) (connecting each single channel in a first layer with a single channel in a second layer) or three-dimensional (3D) (connect each single channel in a second layer with a plurality of channels in a first layer). For example, the cluster-connected CNN 200 shown in FIG. 2 may divide CNN into 3D clusters 206 and may thus delete 3D inter-cluster filters 208, although any dimension of clusters and filters may be used.

By only storing non-zero inter-cluster filters 208 that represent active convolutions between neurons (and not storing zero filters that represent no or negligible convolutions between neurons), the data structure of FIG. 4 may reduce the memory for storing sparse convolution neural network 200 by an amount proportional to the amount of inter-cluster filters 208 deleted in the CNN.

The speed of running a convolutional neural network is proportional to the number of filters in the CNN. Pruning or omitting filters in cluster-connected CNN 200 may result in a direct prediction speed-up in proportion to the number of filters omitted in the CNN.

It will be appreciated by persons of ordinary skill in the art that the arrangement of data structures in FIGS. 1-4 are examples only and other numbers, sizes, dimensions and configurations of neurons, connections, filters, channels, layers, and clusters, may be used.

Additional Sparse Data Representations: The following representations may replace the inefficient conventional sparse matrix representation, additionally or alternatively to the triplet representation of FIG. 4.

A compressed sparse row (CSR) data representation may be used to reduce storage for a sparse matrix. A CSR may represent a matrix in row form using three (one-dimensional) arrays, the first array defining the non-zero values of the matrix and the remaining arrays representing the sparsity pattern of the inter-cluster weights in the matrix. For sparse convolutional neural networks, embodiments of the invention may use modified triplets to represent a 4-dimensional (or higher) matrix or a CSR-based indexing method, or a combination of the two e.g., for different dimensions of the matrix.

A map representation may replace the conventional matrix with a map where the "from" and the "to" neuron IDs (or filter IDs) are mapped to the weight w. This requires a similar amount of storage as the triplet representation, but allows faster access to individual weights (zero and non-zero alike), at the cost of slower addition of new non-zero weights.

A list representation may replace the conventional matrix with a list of pairs <"from", inner_list>, while the inner lists include pairs of the form <"to", w>, where "to", "from", and w are as above. A variant of the above is holding a list of sparse vectors, e.g., to represent the matrix as a list of the size of the number of rows, whose elements are lists of <j, w> pairs (possibly empty, if the neuron at this index has no connections). The list representation may be used with any sparse vector representation, e.g., as follows.

Sparse vector representations include, for example:

A list of <index, value> pairs, either ordered by indices, or unordered.

A dictionary, or a map where an index of a non-zero element is mapped to the element.

Missing indices may be treated as zeros.

Two arrays, one data array holding all non-zero elements, and an index array, which holds the index of the matching data element in the original vector.

A sparse vector of sparse vectors may replace the conventional matrix with a sparse vector in one of the possible sparse vector representations, where each data element is another sparse vector. This may be particularly useful for matrices with multiple zero rows/columns.

A Compressed Sparse Row (a.k.a. Compressed Row Storage) representation may replace the conventional matrix with three arrays: (1) A first data array holding all non-zero weights (e.g., sorted in row-major order, i.e. left-to-right, then top-to-bottom). (2) A second data array represents an incrementing number of elements, by rows (so first element is always zero, the second is the number of non-zero elements in the first row, the third is the number of non-zero elements in the first two rows, and so on, until the last element, which is always the total number of non-zero elements in the entire matrix). (3) A third data array contains the column index j (i.e. the "to" identifier of a neuron) of each non-zero element, matching their order in the data array.

A Compressed Sparse Column (a.k.a. Compressed Column Storage, a.k.a. Harwell-Boeing Sparse Matrix) representation may replace the conventional matrix with three arrays: (1) A first data array of all non-zero inter-cluster weights (e.g., sorted in column-major order, i.e. top-to-bottom, then left-to-right) just like in Compressed Sparse Row. (2) A second data array represents the list of row indices corresponding to the values. (3) A third data array contains a list of indices of the data array, where each new column starts. For example, [1,2,4] means the first element in the data array belongs to the first column in the matrix, the second, and the third elements belong to the second column, and the fourth element begins the third column.

A Modified Compressed Sparse Row: Improves CSR representation may replace the conventional matrix with two arrays: (1) The first data array holds the diagonal values first (e.g., including zeros, if there are any on the diagonal), then the remaining non-zero elements in row-major order (same way as the regular CSR). (2) The second (index) data array is of the same length as the first one. The elements matching the diagonal elements in the first array point to the first element of that row in the data array (so the first element is always the size of the diagonal plus one), while the elements matching the rest of the data specify the column index of that data element in the matrix. For example, a 4×4 matrix with the following values: [[1,2,0,3], [0,4,5,0], [0,0,0,6], [0,0,0,7]], would become the first data array: [1,4,0,7,2,3,5,6] and the second index array: [4,6,7,7,1,3,2,3].

A Modified Compressed Sparse Column representation may replace the conventional matrix with two arrays: (1) The first data array holds the diagonal values first (including zeros, if there are any on the diagonal), then the remaining non-zero elements in column-major order (same way as the regular CSC). (2) The second (index) array is of the same length as the first one. The elements matching the diagonal elements in the first array point to the first element of that column in the data array (so the first element is always the size of the diagonal plus one), while the elements matching the rest of the data specify the row index of that data element in the matrix. For example, a 4×4 matrix with the following values (same values as above): [[1,2,0,3], [0,4,5,0], [0,0,0,6], [0,0,0,7]], would become the first data array: [1,4,0,7,2,5,3,6] and the second index array: [4,4,5,6,1,2,3,3].

A Sparse Tensor representation: Tensors are a generalization of vectors and matrices to higher dimensionality. For example, a 3-dimensional tensor has three indices (rather than two for matrices, and one index for vectors), and may be considered as a vector, whose elements are matrices. Sparse tensor representations can be divided into two categories: (1) A combination of lower dimensional tensors, or a generalization of one of the methods specified. For example, a 3D tensor, may be represented as a vector of matrices, where each matrix is a sparse one, using any of the formats above. (2) Alternatively or additionally, a 3D tensor may be represented by a generalization of Compressed Sparse Row, where the data, the index, and the column arrays are as before, but the index array, maintains pairs of indices, rather than just the row indices.

Inter-cluster weights or filters may be diminished or pruned using any one or more of the following techniques:

Inducing Sparsity During Training: Several embodiments are provided for inducing sparsity during training including any combination of one or more of: $L_1$ regularization, $L_p$ regularization, thresholding, random zero-ing, new weight generation, evolving weights using genetic algorithms, and bias based pruning.

$L_1$ Regularization: Some embodiments of the invention may prune neuron connections using $L_1$ regularization during neural network training in each of one or more iterations (e.g., in addition to weight correcting updates such as backpropagation). The weights $w_{ij}$ of the neural network may be updated to weights $w_{ij}'$ in each training iteration, for example, as follows:

$$w'_{ij} = w_{ij} - \text{sgn}(w_{ij}) * d$$

where d is a "weight decay" parameter (typically a very small number) and sgn is the sign function. The weight decay may be a function of the distance. In other words, at each inter-cluster weight update, the value of the inter-cluster weight is gradually decayed or driven towards zero. The larger the decay parameter (d) of distance between the neurons connected by the inter-cluster weight in the above equation, the faster the inter-cluster weights will approach zero, and the larger the portion of the inter-cluster weights that will become absolute zero, representing a disconnection (pruning of the connection) between cross-cluster neurons.

In one embodiment, pruning may be performed using $L_1$ regularization with a modification: The moment an inter-cluster weight becomes zero (or changes sign), the weight's memory entry is physically removed or deleted from storage (from the triplet representation table), and cannot grow back or regenerate to a non-zero value in the future (e.g., at any future time or for a set lock-out period of time or number of iterations).

$L_p$ regularization: $L_p$ regularization is an extension of $L_1$ regularization that can improve the desired behavior of "pushing" the weights in the network to zero, e.g., as follows:

$$w'_{ij} = w_{ij} - p * w_{ij}^{p-1} * d$$

where d represents a speed of the drive or push to zero, such as a distance between an inter-cluster neurons i and j, and p represents the power of the normalization factor in an $L_p$ normalization, which effectively represents the distribution of the values to which that drive is applied (e.g., p is a positive value). In this example, a higher p shifts the drive to zero more towards higher weights, putting less pressure on lower weights. When regularizing convolutional layers, a whole filter may be regularized together as a unit, in which case, the above $L_p$ regularization may be modified, e.g., as follows:

$$w'_{ij} = w_{ij} - \frac{1}{\sum_{k=-r}^{r} w_{i+k,j+k}^{p}} * d$$

where p is between 0 and 1, and where r is the radius of the kernel (a filter in a convolutional layer), e.g., the kernel is a matrix of size 2*r+1. In this modified $L_p$ regularization, the more neighboring filters have zero values, the greater the pressure on the filter to zero. $L_p$ regularization allows a flexible dynamic pressure, where p may be dynamically modified e.g., based on the percentage of sparsity, to push the derivative/norm of inter-cluster weights to zero. The above equations encourage inter-cluster weights to zero based on the values of the weights themselves, the distance between inter-cluster neurons, and, for convolutional filters, based on the weights of neighboring weights in the same filter as well.

Thresholding: Inter-cluster weights and their entries may be physically deleted when the weight value, though not zero, is below a near zero threshold:

if $(w_{ij} < \text{threshold}) \rightarrow w_{ij} = 0$

The threshold may be balanced to be sufficiently low to not undo error correction (e.g., backpropagation) during training, while being sufficiently high to prune at a reasonably fast rate and prevent that error correction from pulling values away from zero. Example thresholds include, but are not limited to, 0.1, 0.001, 0.0001, 0.00001, etc.

Rounding: Removes values after a pre-specified number of digits after the floating point. For example, given rounding at 5 digits, the value 0.12345678 is set to 0.12345. Rounding will zero a weight when the weight value is less than the minimum allowed by rounding. Otherwise, when rounding does not directly zero a weight, it may result in additional overall sparsity by disrupting some of the weight updates due to backpropagation. The pre-specified number of digits for rounding to may likewise be balanced to be sufficiently few to not undo error correction, while being sufficiently many to prevent that error correction from pulling values away from zero. Any integer number of digits after the floating point to which a weight is rounded may be used.

Random zeroing: Inter-cluster weights may be set to zero with either a fixed small probability (fully-random zeroing), or with a probability proportional to their current value (partially-random zeroing). In the latter case of partially-random zeroing the smaller the weight, the larger the probability of it becoming zero.

In general, any additional or alternative method of pruning that sets inter-cluster weights to zero or that decays inter-cluster weights to approach zero can be used here, including pruning randomly, probabilistically (e.g., with a probability proportional to their current value) and/or using mathematical or statistical heuristics.

New Weight Generation: Additionally or alternatively to setting inter-cluster weights to zero and deleting them from memory (pruning), some embodiments of the invention may randomly generate (create) new inter-cluster weights or connections that were not previously present. New inter-cluster weights may be generated randomly, probabilistically (e.g., the more the two neurons "fire together," the higher the probability that they would be connected and/or the higher the weight of that connection), and/or using mathematical or statistical heuristics.

Evolving sparse neural networks: Genetic algorithms (GA) may be used to train neural networks. GAs represent the set of weights of a neural network as an artificial "chromosome," e.g., where each chromosome represents one neural network. Genetic algorithms may evolve a population of such chromosomes by performing the steps of (a) measuring the fitness or accuracy of each chromosome (e.g., the lower the average loss over the training set, the better the fitness), (b) selecting the fitter chromosomes for breeding, (c) performing recombination or crossover between pairs of parent chromosomes (e.g., randomly choose weights from the parents to create the offspring), and (d) mutating the offspring (e.g., deleting or adding inter-cluster weights). While GAs generally suffer from too much variability and volatility during training, the compact and fast representation of sparse data structures disclosed herein may provide a balance to evolve neural networks efficiently. Alternatively or additionally, genetic programming (GP) could be used as well. GP works in a similar way to GA, with the difference that instead of representing the neural network as a chromosome, it is represented as a "tree". Thus, the neural network architecture (the layers and their connections) could be represented and evolved as a GP tree. While GA typically assumes fixed number of layers and neurons (and evolves only the connections), GP may evolve the number of layers, number of neurons, and/or their connections. As a further additional or alternative method for evolving the neural network architecture, reinforcement learning may also be applied, where a single instance of the neural network architecture is stochastically modified in order to maximize the overall accuracy.

Bias based neuron pruning: A bias unit may "bias" in favor of intra-cluster weights against inter-cluster weights of a neuron during training by adding a boosting or diminishing constant value to the neuron's weights, respectively. If a bias value is low enough (e.g., a large magnitude negative value), the bias unit may shift some of the neuron's inter-cluster weights to a negative value, which are then pruned.

Figure 5:
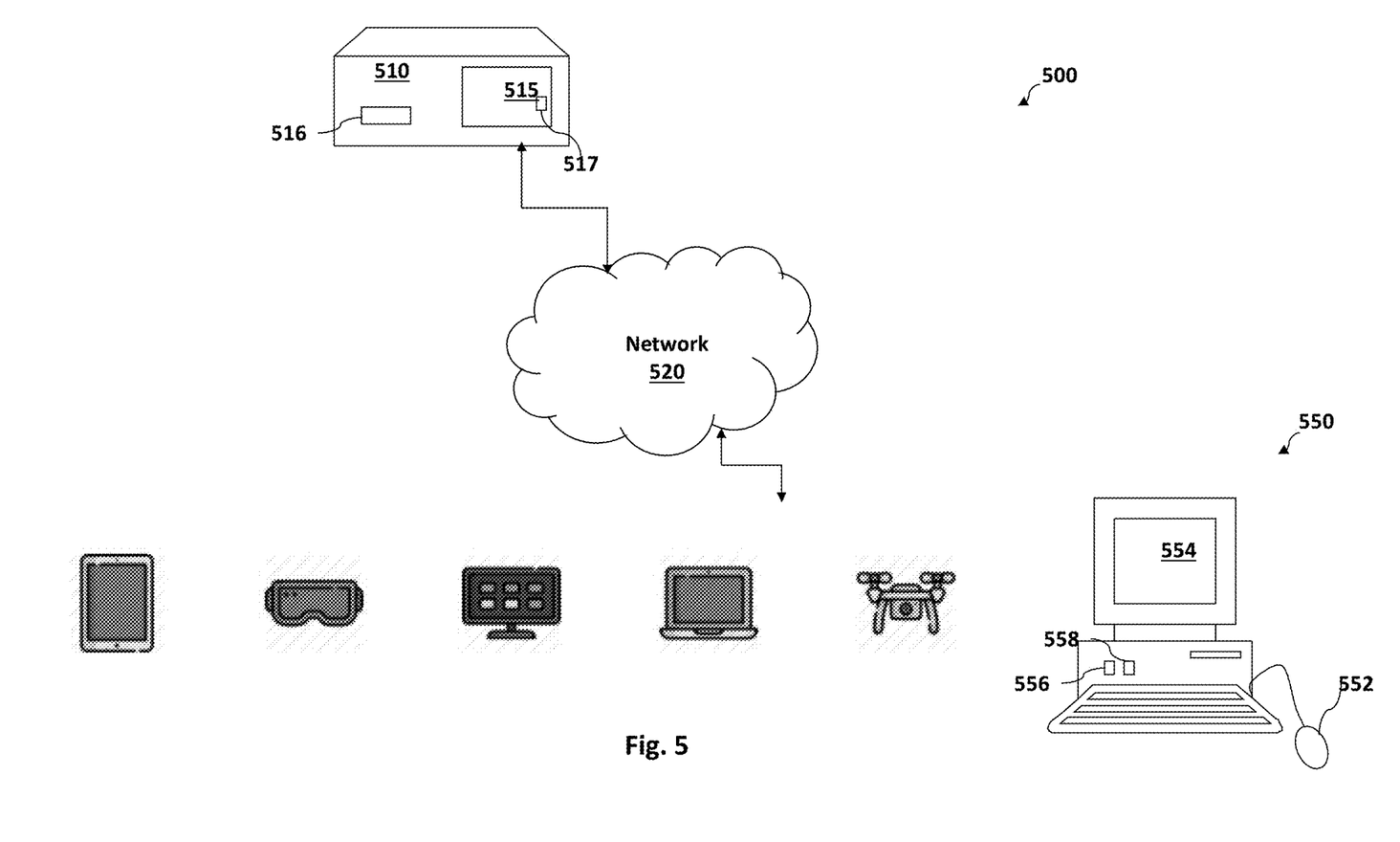
FIG. 5 is a schematic illustration of a system for training and prediction using a cluster-connected neural network, in accordance with some embodiments of the invention.

Reference is made to FIG. 5, which schematically illustrates a system 500 for training and prediction using a cluster-connected neural network according to an embodiment of the invention. System 500 may store and/or generate the data structures and implement the training and prediction of neural networks described in reference to FIGS. 1-4.

System 500 may include one or more local endpoint device(s) 550 and one or more remote server(s) 510 accessible to the local device via a network 520 or computing cloud. Typically, the cluster-connected neural network is trained by remote server 510 and run for prediction at one or more local endpoint devices 550, although either remote server 510 and/or local endpoint devices 550 may train and/or predict using the cluster-connected neural network according to embodiments of the invention. In particular, a data representation (e.g., FIG. 4, CSR, or another sparse matrix representation) is provided for cluster-connected neural networks that is sufficiently compact to allow local endpoint devices 550, which typically have very limited memory and processing capabilities, to train and/or predict based on the cluster-connected neural network. When local endpoint devices 550 perform training and runtime prediction, remote server 510 may be removed.

Remote server 510 may have a memory 515 for storing a cluster-connected neural network and a processor 516 for training and/or predicting based on the cluster-connected neural network. Remote server 510 may initialize with a neural network having disconnected clusters and may add a minority of inter-cluster weights or filters, or may initialize a fully-connected neural network and prune a majority of the inter-cluster weights or filters, to generate the cluster-connected neural network (e.g., 100 of FIG. 1 or 200 of FIG. 2). In some embodiments, remote server 510 may have specialized hardware including a large memory 515 for storing a neural network and a specialized processor 516 (e.g., a GPU), for example, when a dense or fully-connected neural network is used. Memory 515 may store data 517 including a training dataset and data representing a plurality of weights of the cluster-connected neural network. Data 517 may also include code (e.g., software code) or logic, e.g., to enable storage and retrieval of data 517 according to embodiments of the invention.

Local endpoint device(s) 550 may each include one or more memories 558 for storing the cluster-connected neural network according to a data representation (e.g., FIG. 4, CSR, or another sparse matrix representation) provided in some embodiments of the invention. The memory 558 may store each of a plurality of weights of the cluster-connected neural network (e.g., column 3 of the data representations of FIG. 4) with (or associated with) a unique index (e.g., columns 1 and 2 of the data representations of FIG. 4). The unique index may uniquely identify a pair of artificial neurons that have a connection represented by that weight. In one embodiment, each inter-cluster weight or filter may be represented by a triplet defining: (1) a first index value identifying a neuron or channel in a first or "from" cluster connected by the weight or filter, (2) a second index value identifying a neuron or channel in a second or "to" cluster connected by the weight or filter, and (3) the value of the inter-cluster weight or filter. By independently indexing the weights or filters, memory 558 may only store entries for connections with non-zero weights or filters (e.g., deleting or omitting entries for disconnections or no connections associated with zero weights or filters). Memory 558 usage for storing the cluster-connected neural network may be reduced to 2×(100−X) % of the memory used for a dense neural network, for X % sparsity and two times the size of each weight or filter entry, as compared to a fully connected neural network (e.g., a 99% sparsity cluster-connected neural network uses only 2% of the amount of memory used for the dense representation, i.e., 50 times less memory usage). Local endpoint device(s) 550 may each include one or more processor(s) 556 for training, and/or executing prediction based on, the weights or filters of the cluster-connected neural network stored in memory 558. During prediction, the cluster-connected neural network is run forward once. During training, the cluster-connected neural network is run twice, once forward to generate an output and once backwards for error correction (e.g., backpropagation). Each time the cluster-connected neural network is run, the number of computations is reduced and the speed is increased proportionally to the reduction in the number of weights in the cluster-connected neural network. For a cluster-connected neural network with X % sparsity, processor(s) 556 may run neural network (100/(100−X) times faster (with X % fewer computations). When the cluster-connected neural network is initialized with no or sparse inter-cluster connections, the speed-up is instantaneous. Whereas when the cluster-connected neural network is initialized as a dense or fully-connected neural network and then pruned, the speed-up increases over time until the maximal speed up of (100/(100−X) is achieved.

Local endpoint device(s) 550 may include smart devices, personal computer, desktop computer, mobile computer, laptop computer, and notebook computer or any other suitable device such as a cellular telephone, personal digital assistant (PDA), video game console, etc., and may include wired or wireless connections or modems. Local endpoint device(s) 550 may include one or more input device(s) 552 for receiving input from a user (e.g., neural network parameters, such as, numbers, sizes, dimensions and configurations of neurons, synapses, and layers, accuracy, or training thresholds, etc.). Local endpoint device(s) 550 may include one or more output device(s) 554 (e.g., a monitor or screen) for displaying data to a user generated by computer 550 or remote server 510. In various applications, local endpoint device(s) 550 is part of a system for image recognition, computer vision, virtual or augmented reality, speech recognition, text understanding, or other applications of deep learning. In the application of facial recognition, a device may use the sparse neural network to efficiently perform facial recognition to trigger the device to unlock itself or a physical door when a match is detected. In the application of security, a security camera system may use the sparse neural network to efficiently detect a security breach and sound an alarm or other security measure. In the application of autonomous driving, a vehicle computer may use the sparse neural network to control driving operations, e.g., to steer away to avoid a detected object.

Network 520, which connects local endpoint device(s) 550 and remote server 510, may be any public or private network such as the Internet. Access to network 520 may be through wire line, terrestrial wireless, satellite or other systems well known in the art.

Local endpoint device(s) 550 and remote server 510 may include one or more controller(s) or processor(s) 556 and 516, respectively, for executing operations according to embodiments of the invention and one or more memory unit(s) 558 and 515, respectively, for storing data 517 and/or instructions (e.g., software for applying methods according to embodiments of the invention) executable by the processor(s). Processor(s) 556 and 516 may include, for example, a central processing unit (CPU), a graphical processing unit (GPU, a field-programmable gate array (FPGA), an application-specific integrated circuit (ASIC), a digital signal processor (DSP), a microprocessor, a controller, a chip, a microchip, an integrated circuit (IC), or any other suitable multi-purpose or specific processor or controller. Memory unit(s) 558 and 515 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Other devices and configurations may be used, for example, data 517 may be stored in memory 558 and no separate server 510 may be used.

Figure 6:
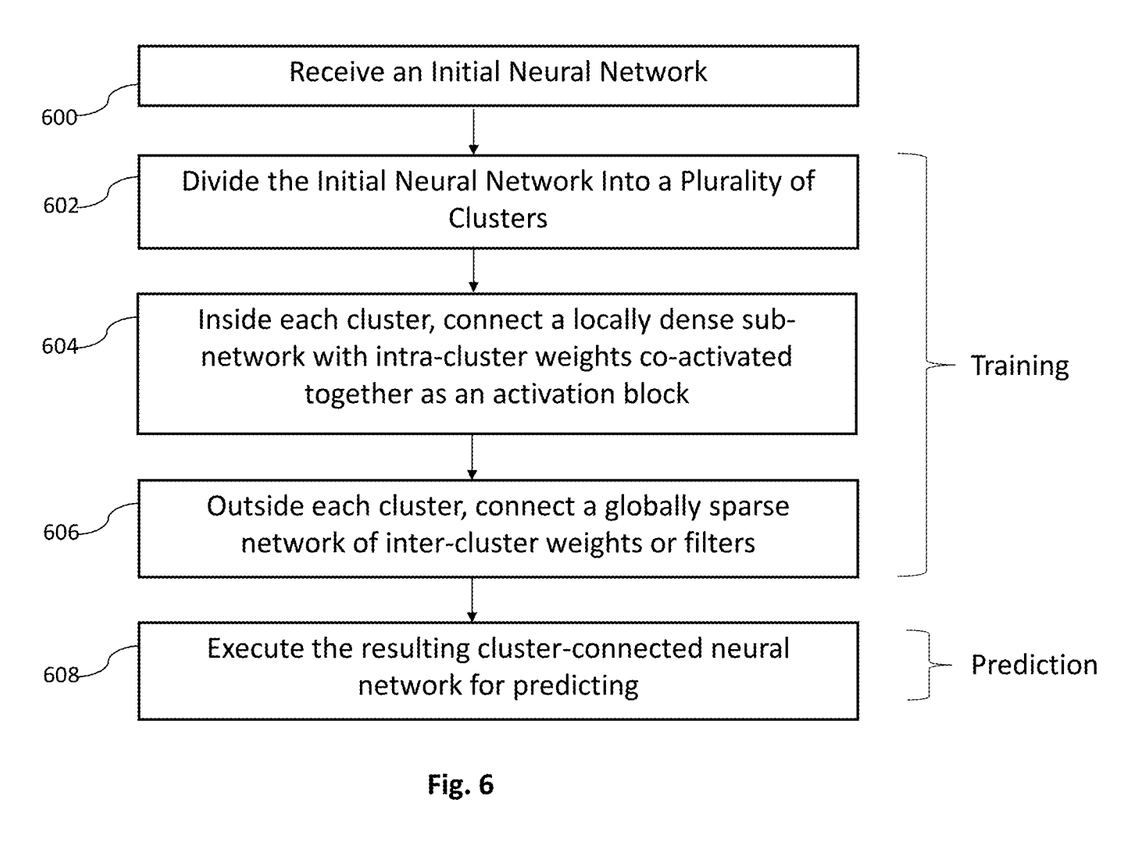
FIG. 6 is a flowchart of a method for training and prediction using a cluster-connected neural network, in accordance with some embodiments of the invention.

Reference is made to FIG. 6, which is a flowchart of a method for training and prediction using a cluster-connected neural network in accordance with some embodiments of the invention. The operations of FIG. 6 may be executed by a processor (e.g., one or more processor(s) 516 and/or 556 of FIG. 5) using data stored in a memory (e.g., one or more memory unit(s) 515 and/or 558 of FIG. 5).

In operation 600, a processor may generate or receive an initial neural network in a memory. The initial neural network may start with dense or fully-connected inter-cluster weights that are subsequently pruned, or may start with sparse or no inter-cluster weights that are added to.

In operation 602, a processor may divide the initial neural network into a plurality of clusters. A processor may store the cluster-divided neutral network, where each cluster may comprise a different plurality of artificial neurons or convolutional channels, and each of a plurality of pairs of neurons or channels are uniquely connected by a weight or convolutional filter.

In operation 604, a processor may generate, train, or receive a cluster-connected neural network with a locally dense sub-network of intra-cluster weights or filters within each cluster of the cluster-connected neural network, wherein a majority of pairs of neurons or channels within the same cluster are connected by (non-zero) intra-cluster weights or filters. The connected majority of pairs of neurons or channels in each cluster may be co-activated together as an activation block (e.g., all activated in the same pass or run of the neural network) during training or prediction using the cluster-connected neural network. The neurons or channels within in each cluster may be fully-connected or partially-connected.

In operation 606, a processor may generate, train, or receive a cluster-connected neural network with a globally sparse network of inter-cluster weights or filters outside each cluster (or between different clusters) of the cluster-connected neural network, wherein a minority of pairs of neurons or channels separated by a cluster border across different clusters are connected by inter-cluster weights or filters. The neurons or channels in the each of the remaining majority of disconnected pairs of inter-cluster neurons or channels are not co-activated together during training or prediction because each such neuron or channel pair is not connected.

When the initial neural network of operation 600 has densely or fully-connected inter-cluster weights or filters, the processor may train the globally sparse network of inter-cluster weights or filters by pruning a majority of the inter-cluster weights or filters. When the initial neural network of operation 600 has sparse or no inter-cluster weights or filters, the processor may train the globally sparse network of inter-cluster weights or filters by adding or rearranging a minority of possible inter-cluster weights or filters. The processor may prune pre-existing or add new inter-cluster weights during and/or after a training phase of the neural network. The processor may prune inter-cluster weights during a training phase by biasing in favor of intra-cluster weights, and biasing against inter-cluster weights. The processor may prune inter-cluster weights using $L_1$ regularization, $L_p$ regularization, thresholding, random zero-ing, and bias based pruning. In some embodiments, the processor may train the cluster-connected neural network such that the strength of its weights or filters are biased inversely proportionally to the distance between the neurons or channels connected by the weights of filters. The processor may prune weights randomly, probabilistically, and/or heuristically. The processor may add one or more new inter-cluster weights in the cluster-connected neural network by connection creation. New weights may be generated randomly, probabilistically, and/or heuristically. In some embodiments, the cluster-connected neural network may be evolved using evolutionary computation (genetic algorithms or genetic programming) or using reinforcement learning.

A processor may test neuron or channel activation patterns in the cluster-connected neural network to determine an optimal cluster shape that most closely resembles activation patterns of highly linked neurons or channels resulting from the test. The processor may dynamically adjust the optimal cluster shape as activation patterns change during training. In various embodiments, the cluster border of one or more of the plurality of clusters may have a shape in a column (N×1 or N×M dimension), row (1×N or M×N dimension), circle, polygon, irregular shape, rectangular prism, cylinder, sphere, polyhedron, and/or any two-dimensional, three-dimensional, or N-dimensional shape. Combinations of different shapes may be used. In some embodiments, the cluster-connected neural network is a hybrid of cluster-connected regions and standard non-cluster-connected regions. In some embodiments, inter-cluster connections may only connect border neurons, but not interior neurons. For example, border neurons or channels in one cluster are connected by inter-cluster weights or filters to border neurons or channels in one or more different clusters, whereas interior neurons or channels spaced from the cluster boarded are only connected by intra-cluster weights or filters to other neurons or channels in the same cluster. Examples of cluster-connected neural networks are described in reference to FIGS. 1 and 2.

Various indexing methods may be used according to embodiment of the invention. Values of the inter-cluster weights or filters of the cluster-connected neural network may be stored using compressed sparse row (CSR) representation, compressed sparse column (CSC) representation, sparse tensor representation, map representation, list representation and/or sparse vector representation, any other sparse matrix or neural network representation. In some embodiments, a memory may store intra-cluster weights or filters in each channel of the cluster-connected neural network with an association to a unique cluster index, and use a cluster-specific matrix representing the intra-cluster weights in the cluster by their matrix positions. In some embodiments, a memory may store each of the plurality of inter-cluster weights or filters of the cluster-connected neural network with an association to a unique index. The unique index may uniquely identify a pair of artificial neurons or channels that have a connection represented by the inter-cluster weight or filter, wherein only non-zero inter-cluster weights or filters are stored that represent connections between pairs of neurons or channels in different clusters and zero inter-cluster weights or filters are not stored that represent no connections between pairs of neurons or channels. In some embodiments, the memory may store a triplet of values identifying each inter-cluster weight or filter, e.g., as shown in FIG. 4, comprising: a first value of the index identifying a first neuron or channel of the pair in a first cluster (e.g., FIG. 4 column 1), a second value of the index identifying a second neuron or channel of the pair in a second different cluster (e.g., FIG. 4 column 2), and the value of the inter-cluster weight or filter (e.g., FIG. 4 column 3).

In operation 608, a processor may execute the cluster-connected neural network generated, trained, or received in operations 600-606 for prediction. In prediction mode, the processor may retrieve from memory and run the cluster-connected neural network configured in operations 604 and 606 to compute an output based only on the minority of non-zero weights inter-cluster weights or filters (and not based on the zero inter-cluster weights or filters) of the cluster-connected neural network. To predict, the processor may input source data into an input layer of the cluster-connected neural network, propagate the data through the plurality of neuron or channel layers of the sparse neural network by iteratively operating on the data in each layer by only the non-zero weights connecting neurons of that layer to subsequent layers, and output a result of the final layer of the cluster-connected neural network.

In some embodiment, during either the forward training or prediction pass, a processor may fetch inter-cluster weights or filters from a main memory that are stored in non-sequential locations in the main memory according to a non-sequential pattern of the indices associated with a sparse distribution of non-zero inter-cluster weights or filters in the cluster-connected neural network. After those inter-cluster weights or filters are fetched from non-sequential locations in the main memory, they may be stored in sequential memory locations in a local or cache memory.

Other operations or orders of operations may be used. For example, instead of starting with an initial (non-cluster-connected) neural network in operation 600 and training a cluster-connected neural network, some embodiments may receive a fully-trained cluster-connected neural network, skip operations 600-608, and start a process at operation 610 to perform prediction using the cluster-connected neural network. Further, operation 604 (training inside each cluster) and operation 606 (training outside each cluster) are often part of the same training process and executed simultaneously as part of the same operation. In some embodiments, there may be no training inside clusters, e.g., where inside each cluster is a fully-connected network, so operation 604 may be skipped.

Results: Applying embodiments of the invention to several deep learning benchmarks resulted in a reduction of between 90-99% of the number of weights in a neural network, while maintaining more than 99% of the original accuracy. This corresponds to between 10 to 100 times speed-up in computing speed for the neural network (during prediction mode, but also during training mode as the network becomes sparser in each iteration of training), and a 5 to 50 times reduction in memory usage.

Thus, deep learning networks can be run efficiently on devices with minimal amount of CPU capability and memory availability (e.g., local endpoint device(s) 550 of FIG. 5), not just specially hardware in cloud or network-side servers (e.g., remote server 510 of FIG. 5), something that was not possible until now. Additionally, the compact (e.g., triplet) representation of weights may be easily parallelized on any hardware (CPU, GPU, etc.) to further increase processing speed.

Using the compact (e.g., triplet) representation for sparse neural networks, embodiments of the invention may provide sufficient efficiency to evolve the cluster-connected neural networks.

To speed-up training and prediction of a cluster-connected convolutional NN, the convolution operation (e.g., which is typically relatively slow and complex) may be equivalently performed by a matrix multiplication operation executed on rearranged and duplicated terms (e.g., typically relatively faster and less complex than the convolution operations). This transformation is referred to as an "img2col" function. Some embodiments provide a new and more compact img2col function adapted for a sparse CNN. In a regular img2col function, two custom matrices are constructed to represent every convolutional operation performed by a layer, such that each row and column multiplication represents a convolutional operation. Embodiments of the invention may provide a modified img2col function, in which some of the kernels are zeroed out, and the associated matrices can be modified to omit or delete these rows and columns. This results in more compact matrices associated with fewer multiplication operations to achieve the same convolutional results, compared to standard img2col operations.

Embodiments of the invention relevant to neurons and weights of neural networks may be applied to channels and filters, respectively, of convolutional neural networks.

Although embodiment of the invention describe sparse indexing for inter-cluster weights, the same sparse indexing may additionally or alternatively be applied to intra-cluster weights. Alternatively, no sparse indexing may be used.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 515 or 558 of FIG. 5), a disk drive, or a USB flash memory, encoding, including or storing instructions, e.g., computer-executable instructions, which, when executed by a processor or controller (e.g., processor 516 or 556 of FIG. 5), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments.

Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for training or prediction using a cluster-connected neural network at a local endpoint device, the method comprising:
storing a cluster-connected neural network at the local endpoint device, the cluster-connected neural network having a neural network axis in an orientation extending from an input layer to an output layer and orthogonal to a plurality of intermediate layers, wherein the cluster-connected neural network is divided into a plurality of clusters, wherein each cluster comprises a different plurality of artificial neurons or convolutional channels, wherein the artificial neurons or convolutional channels of each cluster are in a region extending parallel to the direction of the neural network axis resulting in a predominant direction of neuron activation extending from the input layer toward the output layer, wherein each pair of neurons or channels are uniquely connected by a weight or convolutional filter;
within each cluster of the cluster-connected neural network, generating or maintaining a locally dense sub-network of intra-cluster weights or filters, in which a majority of pairs of neurons or channels within the same cluster are connected by intra-cluster weights or filters, such that, the connected majority of pairs of neurons or channels in each cluster are co-activated together as an activation block during training or prediction using the cluster-connected neural network;
outside each cluster of the cluster-connected neural network, generating or maintaining a globally sparse network of inter-cluster weights or filters, in which a minority of pairs of neurons or channels separated by a cluster border across different clusters are connected by inter-cluster weights or filters; and
performing prediction using the cluster-connected neural network at the local endpoint device.

2. The method of claim 1 comprising testing neuron or channel activation patterns in the cluster-connected neural network to determine an optimal cluster shape that most closely resembles activation patterns of highly linked neurons or channels resulting from the test.

3. The method of claim 2 comprising dynamically adjusting the optimal cluster shape as activation patterns change during training.

4. The method of claim 1, wherein the cluster border of one or more of the plurality of clusters has a shape selected from the group consisting of: a column, row, circle, polygon, irregular shape, rectangular prism, cylinder, polyhedron, and another two-dimensional, three-dimensional, or N-dimensional shape.

5. The method of claim 1 comprising training the cluster-connected neural network by initializing a neural network with disconnected clusters and adding a minority of inter-cluster weights or filters.

6. The method of claim 1 comprising training the cluster-connected neural network by initializing a fully-connected neural network and pruning a majority of the inter-cluster weights or filters.

7. The method of claim 6, wherein said pruning is performed during a training phase by biasing in favor of intra-cluster weights, and biasing against inter-cluster weights.

8. The method of claim 6, wherein said pruning is performed using one or more techniques selected from the group consisting of: $L_1$ regularization, $L_p$ regularization, thresholding, random zero-ing, and bias based pruning.

9. The method of claim 1, wherein the cluster-connected neural network is trained such that the strength of its weights or filters are biased inversely proportionally to the distance between the neurons or channels connected by the weights of filters.

10. The method of claim 1 comprising training the cluster-connected neural network using an evolutionary algorithm or reinforcement learning.

11. The method of claim 1, wherein border neurons or channels in one cluster are connected by inter-cluster weights or filters to border neurons or channels in one or more different clusters, whereas interior neurons or channels spaced from the cluster border are only connected by intra-cluster weights or filters to other neurons or channels in the same cluster.

12. The method of claim 1, wherein the neurons or channels in each cluster are fully-connected or partially connected.

13. The method of claim 1, wherein the cluster-connected neural network is a hybrid of cluster-connected regions and standard non-cluster-connected regions.

14. The method of claim 1 comprising storing inter-cluster weights or filters in each channel of the cluster-connected neural network with an association to a unique cluster index, and using a cluster-specific matrix representing the intra-cluster weights in the cluster by their matrix positions.

15. The method of claim 1 comprising storing each of the plurality of inter-cluster weights or filters of the cluster-connected neural network with an association to a unique index, the unique index uniquely identifying a pair of artificial neurons or channels that have a connection represented by the inter-cluster weight or filter, wherein only non-zero inter-cluster weights or filters are stored that represent connections between pairs of neurons or channels in different clusters and zero inter-cluster weights or filters are not stored that represent no connections between pairs of neurons or channels.

16. The method of claim 15 comprising storing a triplet of values identifying each inter-cluster weight or filter comprising:
a first value of the unique index identifying a first neuron or channel of a pair of neurons or channels in a first cluster,
a second value of the unique index identifying a second neuron or channel of a pair of neurons or channels in a second different cluster, and
a value of the inter-cluster weight or filter.

17. The method of claim 15 comprising:
fetching inter-cluster weights or filters from a main memory that are stored in non-sequential locations in the main memory according to a non-sequential pattern of the indices associated with a sparse distribution of non-zero inter-cluster weights or filters in the cluster-connected neural network; and
storing the inter-cluster weights or filters fetched from non-sequential locations in the main memory to sequential locations in a cache memory.

18. The method of claim 15 comprising storing values of the inter-cluster weights or filters of the cluster-connected neural network using one or more data representations selected from the group consisting of: compressed sparse row (CSR) representation, compressed sparse column (CSC) representation, sparse tensor representation, map representation, list representation and sparse vector representation.

19. A system for training or prediction using a cluster-connected neural network at a local endpoint device, the system comprising:
   one or more memories of the local endpoint device configured to store a neural network having a cluster-connected neural network axis in an orientation extending from an input layer to an output layer and orthogonal to a plurality of intermediate layers, wherein the cluster-connected neural network is divided into a plurality of clusters, wherein each cluster comprises a different plurality of artificial neurons or convolutional channels in a region extending parallel to the direction of the neural network axis resulting in a predominant direction of neuron activation extending from the input layer toward the output layer, wherein each pair of neurons or channels are uniquely connected by a weight or convolutional filter; and
   one or more processors of the local endpoint device configured to:
      within each cluster of the cluster-connected neural network, generate or maintain a locally dense sub-network of intra-cluster weights or filters, in which a majority of pairs of neurons or channels within the same cluster are connected by intra-cluster weights or filters, such that, the connected majority of pairs of neurons or channels in each cluster are co-activated together as an activation block during training or prediction using the cluster-connected neural network,
      outside each cluster of the cluster-connected neural network, generate or maintain a globally sparse network of inter-cluster weights or filters, in which a minority of pairs of neurons or channels separated by a cluster border across different clusters are connected by inter-cluster weights or filters, and
      perform prediction using the cluster-connected neural network at the local endpoint device.

20. The system of claim 19, wherein the one or more processors are configured to test neuron or channel activation patterns in the cluster-connected neural network to determine an optimal cluster shape that most closely resembles activation patterns of highly linked neurons or channels resulting from the test.

21. The system of claim 20, wherein the one or more processors are configured to dynamically adjust the optimal cluster shape as activation patterns change during training.

22. The system of claim 19, wherein the cluster border of one or more of the plurality of clusters has a shape selected from the group consisting of: a column, row, circle, polygon, irregular shape, rectangular prism, cylinder, polyhedron, and another two-dimensional, three-dimensional, or N-dimensional shape.

23. The system of claim 19, wherein the one or more processors are configured to train the cluster-connected neural network by initializing a neural network with disconnected clusters and adding a minority of inter-cluster weights or filters.

24. The system of claim 19, wherein the one or more processors are configured to train the cluster-connected neural network by initializing a fully-connected neural network and pruning a majority of the inter-cluster weights or filters.

25. The system of claim 19, wherein border neurons or channels in one cluster are connected by inter-cluster weights or filters to border neurons or channels in one or more different clusters, whereas interior neurons or channels spaced from the cluster border are only connected by intra-cluster weights or filters to other neurons or channels in the same cluster.

26. The system of claim 19, wherein the one or more memories are configured to store inter-cluster weights or filters in each channel of the cluster-connected neural network with an association to a unique cluster index, and use a cluster-specific matrix representing the intra-cluster weights in the cluster by their matrix positions.

27. The system of claim 19, wherein the one or more memories are configured to store each of the plurality of inter-cluster weights or filters of the cluster-connected neural network with an association to a unique index, the unique index uniquely identifying a pair of artificial neurons or channels that have a connection represented by the inter-cluster weight or filter, wherein only non-zero inter-cluster weights or filters are stored that represent connections between pairs of neurons or channels in different clusters and zero inter-cluster weights or filters are not stored that represent no connections between pairs of neurons or channels.

28. The system of claim 19, wherein the one or more memories are configured to store a triplet of values identifying each inter-cluster weight or filter comprising:
   a first value of the unique index identifying a first neuron or channel of a pair of neurons or channels in a first cluster,
   a second value of the unique index identifying a second neuron or channel of a pair of neurons or channels in a second different cluster, and
   a value of the inter-cluster weight or filter.

29. The system of claim 19, wherein the one or more processors are configured to:
   fetch inter-cluster weights or filters from a main memory that are stored in non-sequential locations in the main memory according to a non-sequential pattern of indices associated with a sparse distribution of non-zero inter-cluster weights or filters in the cluster-connected neural network, and
   store the inter-cluster weights or filters fetched from non-sequential locations in the main memory to sequential locations in a cache memory.

30. The system of claim 19, wherein the one or more memories are configured to store values of the inter-cluster weights or filters of the cluster-connected neural network using one or more data representations selected from the group consisting of: compressed sparse row (CSR) representation, compressed sparse column (CSC) representation, sparse tensor representation, map representation, list representation and sparse vector representation.

* * * * *